United States Patent [19]

Bol et al.

[11] 3,768,154

[45] Oct. 30, 1973

[54] METHOD OF MANUFACTURING A MULTIPLE MAGNETIC HEAD

[75] Inventors: Arie Bol; Johannes van Ginkel; Adrianus Henricus Maria van der Schoot; Petrus Henricus Swaanen, all of Emmasingel, Eindhoven, Netherlands

[73] Assignee: U. S. Philips Corporation, New York, N.Y.

[22] Filed: Mar. 15, 1972

[21] Appl. No.: 234,713

[30] Foreign Application Priority Data

Mar. 17, 1971 Netherlands ....................... 7103549

[52] U.S. Cl. ............................ 29/603, 179/100.2 C

[51] Int. Cl. ........................... G11b 5/42, H01f 7/06

[58] Field of Search ................ 29/603; 179/100.2 C; 340/174.1 F; 346/74 MC

[56] References Cited

UNITED STATES PATENTS

| | | | |
|---|---|---|---|
| 3,543,396 | 12/1970 | Illg et al. | 29/603 |
| 3,402,463 | 9/1968 | Bos et al. | 29/603 |
| 3,668,775 | 6/1972 | Morita et al. | 29/603 |
| 3,562,442 | 2/1971 | Pear, Jr. | 29/603 X |
| 3,593,414 | 7/1971 | Beun et al. | 29/603 |
| 3,634,933 | 1/1972 | Hanak | 29/603 |

*Primary Examiner*—Charles W. Lanham
*Assistant Examiner*—Carl E. Hall
*Attorney*—Frank R. Trifari

[57] ABSTRACT

The invention relates to a method of properly providing screening plates in multiple magnetic heads. In manufacturing multiple magnetic heads, which are composed of two or more mouldings of ferrite, cemented together with screening plates cemented in sawcuts arranged in said mouldings, the screening plates are provided, for example, with a pattern of grooves, or are arranged at an angle with the axis of their cut, so as to prevent engagement on one side of a screening plate against a wall of its cut.

1 Claim, 9 Drawing Figures

METHOD OF MANUFACTURING A MULTIPLE MAGNETIC HEAD

The invention relates to a method of manufacturing a multiple magnetic head for magnetic data recording. The head comprises at least two cores of a magnetizable material each constituting a substantially closed path for magnetic flux, and being separated from each other by a spacing and screening member. The method comprises a first operational step in which at least two mouldings of a magnetizable material having accurately machined surfaces are placed against each other and combined to form one assembly by means of a cement. From this assembly in a later stage of manufacture, two or more mutually cohering cores can be manufactured. A second operational step comprises making a cut in at least one of the mouldings in those places where a spacing and screening member is to be provided. A third operational step comprises cementing a spacing and screening member in each cut by means of an adhesive drawn in by capillary forces.

Such a method is known both for manufacturing a multichannel magnetic head, i.e., a magnetic head having a number of cores which are arranged transverse to the direction of movement of a record carrier moving past the head, and for manufacturing a multigraph magnetic head, i.e., a magnetic head having a number of cores which are arranged in the direction of movement of a record carrier being guided past the head.

In this known method, a few alternative methods are to be distinguished.

According to a first method, the sawcuts for cementing the screening member are arranged in that side of the assembly of mouldings which is situated opposite to the side constituting the operative face in the ultimate head. Upon machining the assembly of mouldings, the side of the operative face is ground down to the screening members cemented in the cuts, so as to magnetically separate the respective cores from each other. For a two-channel-head which is initially made from 2 mouldings, the method as described in Philips research Report, vol. 15, 1960, pp.362–65 can be used. For a double-gap-head which is initially made from 3 mouldings, the method as described in British Pat. No. 1,147,944 can be used.

According to a second method, the cuts in the assembly of mouldings are provided in the side of the operative face, and the respective cores are separated magnetically in a later stage of the machining, by means of sawing and/or grinding operations on the side of the assembly remote from the operative face. For a multichannel head, the method as described in British Pat. No. 1,086,233 can be used. It is to be noted that in the last-mentioned Patent it is also described how the adhesive material for the mouldings (in that case glass) and the adhesive material for the intermediate members (likewise glass) is made to flow into the narrow seams formed between the various parts during the same heating step under the influence of capillary forces.

According to a third method for the manufacture of a multichannel double-gap head, a first set of cuts is provided in the lower side of an assembly of three mouldings cemented together, and a second set of wider sawcuts extending to just inside the central moulding is made in one of the side faces throughout the height along the axes of the sawcuts already made.

The three above-described methods have one thing in common: In manufacturing a multiple magnetic head, the assembly of mouldings is either held together during the various machining stages by a so-called engineering excess which is ground away later-on, or by the central moulding in an assembly of three, as a result of which a great accuracy in sizes can be obtained.

In all three cases, it presents great advantages to cement the intermediate members into the cuts by means of an adhesive drawn in by capillary forces as described in the above-mentioned British Pat. No. 1,086,233.

It has been found, however, that certain difficulties may present themselves in heads manufactured in such manner. Heads made this way usually have the requirement that the cores being screened from each other must be situated at a small distance apart, so that with a given fixed thickness of the intermediate members, the thickness of the adhering seams must be chosen to be very small (for example in the order of 10 to 20 microns). Difficulties are usually due to a mechanically weak construction of the head, and to an accelerated erosion of the tape contact face.

It is the object of the invention to solve these difficulties. The invention recognizes that during the production process the screening members to be cemented may accidently unilaterally engage a wall of the cut causing very narrow cementing seams to be formed. On the other hand, it is just in narrow seams that, when the cement flows in, gas inclusions occur, which not only hamper a good wetting of the adhering surfaces, but also manifest themselves as holes in the tape contact face of the finished head. In operation this may result in accelerated erosion of the tape contact face of the head. The term "unilaterally engaging" is to be understood to include mainly three cases: A screening member may engage its cut at such an oblique angle that its upper side bears against one wall of the cut, and its lower side against the other; an intermediate member may engage one wall of the cut entirely upright; or an intermediate member is much closer to one wall of the cut than to the other.

In a first method according to the invention, unilateral engagement of a spacing and screening member against a wall of its cut is prevented by providing on either side of each spacing and screening member, a pattern of grooves prior to its introduction into its cut. The member is then inserted into its cut in such manner, that the grooves extend in the direction in which the adhesive is to be drawn in.

Particularly, when the depth of the grooves is at least as large as the thickness of the thinnest acceptable adhering layer, a good adhesion is obtained even in the case in which a screening member almost entirely engages the wall of its cut. The profile of the grooves should preferably be chosen so that the contact surface of the spacing and screening member with the wall of the cut is minimized.

In those cases in which the screening members are not machined, the object of the invention can be achieved by intentionally placing the screening members diagonally but upright in the cuts. Although the adhering seams then extend obliquely, unilateral engagement of the screening members is prevented so that there is sufficient space for the adhesive to flow in.

A second method according to the invention requires that each spacing and screening member be placed at an angle with the axis of the cut in which it is inserted.

The screening members preferably extend laterally beyond the sawcuts facilitating their proper positioning. With one motion of the hand, even a great number of screening members already placed in the sawcuts can be simultaneously set in the desirable position, by wiping along the projecting parts in one direction.

With certain types of magnetic heads, however, it may be more desirable for the screening members to be cemented centrally in the sawcuts. In such case the above-mentioned solutions are not possible.

In a third method, according to the invention, each spacing and screening member is provided on either side with at least one shim or each cut is provided with a local narrowing, so as to be able to centrally position the relative member as much as possible in its cut.

In order that the invention may be readily carried into effect, a number of embodiments thereof will now be described in greater detail, by way of example, with reference to the accompanying drawings, in which.

Figure 1:
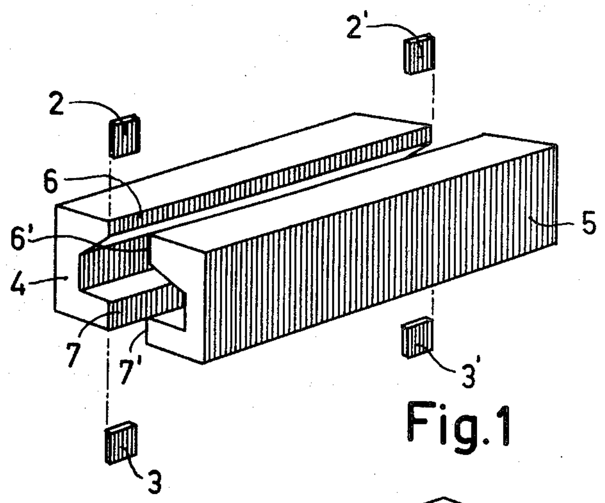
FIG. 1 is a perspective view of two mouldings of ferrite having a given cross-section and having their polished surfaces facing each other.

FIG. 1 shows a pair of mouldings of ferrite 4, 5. They are provided with polished surfaces 6, 7 and 6', 7'. After the interposition of spacing members 2, 2' and 3, 3', the mouldings 4 and 5 are placed together with their polished surfaces 6, 7 and 6', 7' in juxtaposition.

Figure 2:
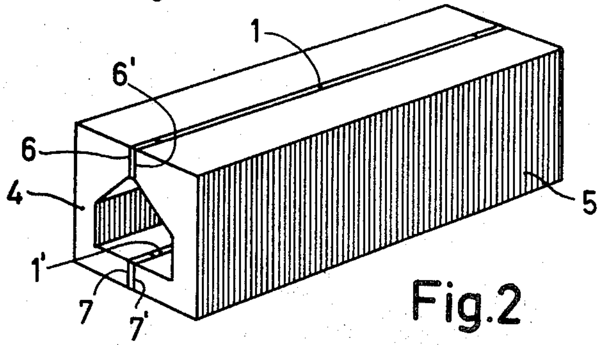
FIG. 2 is a perspective view of the two mouldings of FIG. 1 which are cemented together at their polished surfaces by means of a cement.

FIG. 2 shows the assembly of mouldings 4, 5 after they have been cemented together by way of example glass may be drawn-in by capillary action in the spaces 1, 1' between the polished surfaces 6 and 6' and 7 and 7'.

Figure 3:
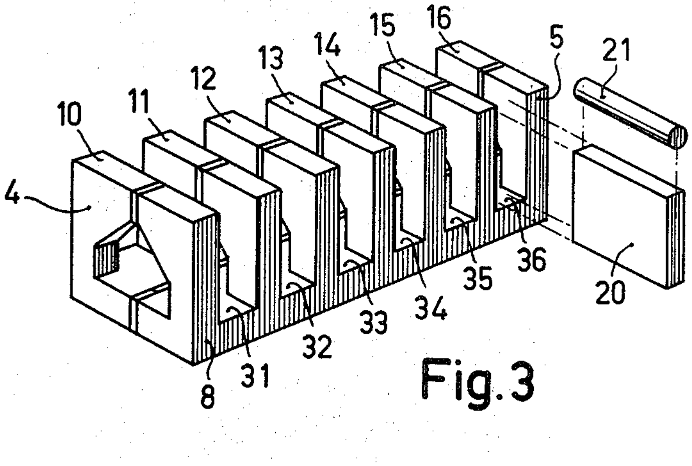
FIG. 3 is a perspective view of the two mouldings shown in FIG. 2 which are cemented together and which are provided with a number of saw cuts transverse to the adhering surfaces.

As shown in FIG. 3, a number of sawcuts 31, 32, . . . 36, are provided in the assembly at right angles to the adhering surfaces 6, 6' and 7, 7', so that a number of pole piece plates for magnetic heads 10, 11, . . . 16 is obtained. These sawcuts 31, 32, . . . 36 in the case shown, have the same mutual distance and equal width and height. It is to be noted that in this stage of the manufacture the various pole peice plates 10, 11, . . . 16 are held together by the so-called engineering excess 8.

Figure 4:
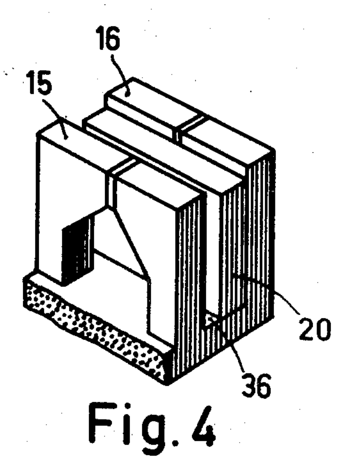
FIGS. 4 and 5 show two examples of unilateral engagement of a screening plate in its sawcut.
Figure 5:
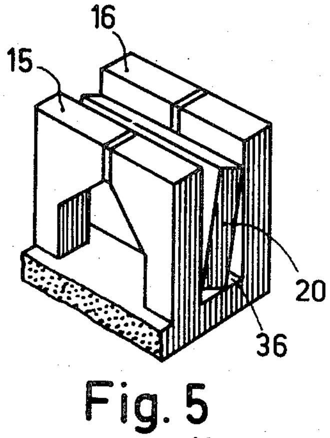

In the sawcuts 31 . . . 36, screening and spacing plates 20 must be placed and cemented. This may be done, for example, by laying glass fibres 21 on top of the screening and spacing plates. The plates have a height which is slightly smaller than the depth of the sawcuts and then by heating the assembly in a furnace to the flow temperature of the glass used for the fibres the glass is drawn-in by capillary action between the walls of the sawcuts and the screening and spacing plates placed therein. The danger exists, however, that during this process a plate will unilaterally engage the wall of its sawcut. As a result, the cement cannot readily wet the faces to be sealed on that side. This situation is shown in FIG. 4, in which the plate 20 entirely engages the pole piece plate 16 upright, and in FIG. 5, in which the plate 20 engages the pole piece plate 16 with its upper side and engages the pole piece plate 15 with its lower side. A good flow of the cement is not possible in either case.

Figure 6:
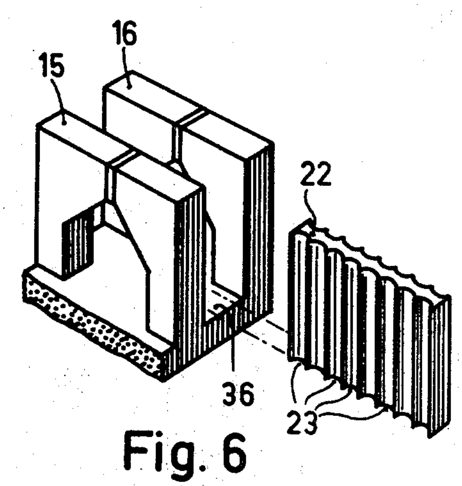
FIGS. 6, 7, 8 and 9 show four embodiments of manners in which, according to the invention, a unilateral engagement of a screening plate in its sawcut can be prevented.

A good flow will be possible irrespective of the location of the plate in its sawcut, if the plate 22 is provided with a pattern of grooves 23, extending in the direction in which the cement flows-in (FIG. 6). The profile of the grooves should be so chosen that the contact surface of the plate with the wall of the sawcut 36 is minimum.

It is also possible to have a good flow of the cement without mechanically working the plate as in the preceding case.

Figure 7:
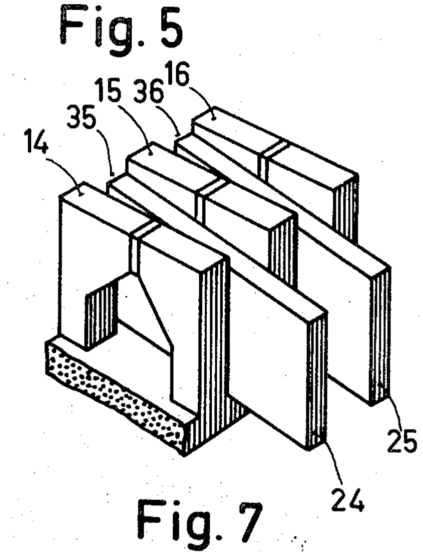

As shown in FIG. 7, the plates 24, 25 are intentionally placed diagonally but upright in their sawcuts 35, 36 respectively. In this case, the cement can sufficiently flow on either side of the plates. The plates 24, 25 should preferably project from the sawcuts 35, 36 so that the desirable inclination can be realized simultaneously for all plates by one movement of the hand.

Figure 8:
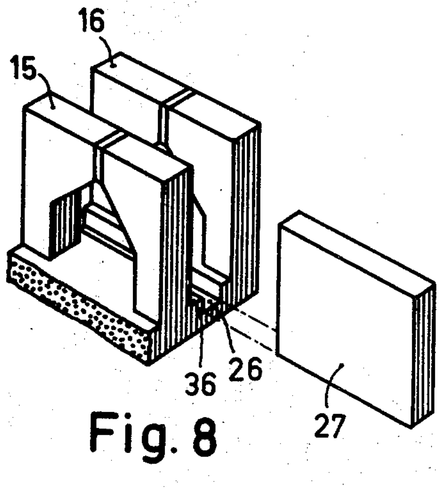
Figure 9:
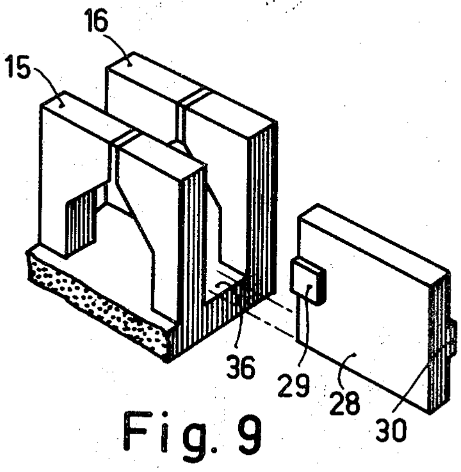

FIGS. 8 and 9 show methods to ensure that a plate is exactly centrally positioned in its sawcut. FIG. 8 shows that the sawcut 36 is provided in its centre with a deeper narrowing 26 in which the plate 27 fits accurately. FIG. 9 shows that the plate 28 is provided on one side with a shim 29 and on the other side with a shim 30 as a result of which the desirable position of the plate 28 in the sawcut 36 can also be ensured.

What is claimed is:

1. A method of manufacturing a multiple magnetic head for magnetic data recording having at least two cores of a magnetizable material, each constituting a substantially closed path for magnetic flux, said cores being separated from each other by a spacing and screening member, the method comprising the steps of:

A. placing at least two mouldings of a magnetizable material adjacent each other, each moulding having a machined surface which faces the other said machined surface;

B. cementing said mouldings to form an assembly;

C. cutting the assembly to provide at least one space for a spacing and screening member said space being bounded by two walls;

D. providing a spacing and screening member, each side of which has a pattern of grooves and a plurality of ridges alternating with said grooves;

E. placing said spacing and screening member in the provided space such that said grooves be within the space, and extend in a direction in which adhesive is to be drawn into said space through said grooves and such that said ridges contact said walls thereby positioning said member in said space; and F. cementing said spacing and screening member in said provided space by drawing adhesive into said space through said grooves by capillary action.

* * * * *